(12) United States Patent
Huculak et al.

(10) Patent No.: US 8,206,040 B1
(45) Date of Patent: Jun. 26, 2012

(54) LASER CONNECTOR ACCESSORY WITH DEFINED ELECTRICAL CHARACTERISTICS

(75) Inventors: John Christopher Huculak, Mission Viejo, CA (US); Michael Arthur Zica, Costa Mesa, CA (US); Jack Robert Auld, Laguna Niguel, CA (US); Michael McCulloch Martin, Newport Beach, CA (US); Matthew Braden Flowers, Lake Forest, CA (US); Marcus Antonio Souza, Costa Mesa, CA (US); Mark Harrison Farley, Laguna Niguel, CA (US)

(73) Assignee: Alcon Research, Ltd., Fort Worth, TX (US)

( * ) Notice: Subject to any disclaimer, the term of this patent is extended or adjusted under 35 U.S.C. 154(b) by 363 days.

(21) Appl. No.: 12/693,130

(22) Filed: Jan. 25, 2010

(51) Int. Cl.
*G02B 6/36* (2006.01)

(52) U.S. Cl. .............................. 385/53; 385/88; 385/93

(58) Field of Classification Search .............. 385/53–93
See application file for complete search history.

(56) References Cited

U.S. PATENT DOCUMENTS

| | | | |
|---|---|---|---|
| 4,256,936 A * | 3/1981 | Lancaster | 200/51.07 |
| 4,778,240 A * | 10/1988 | Komatsu | 385/88 |
| 5,085,492 A | 2/1992 | Kelsoe et al. | |
| 5,295,214 A * | 3/1994 | Card et al. | 385/92 |
| 5,848,209 A | 12/1998 | Evans et al. | |
| 5,875,275 A | 2/1999 | Evans et al. | |
| 6,357,932 B1 | 3/2002 | Auld | |
| 6,634,799 B2 | 10/2003 | Auld | |
| 7,211,830 B2 * | 5/2007 | Rosenberg et al. | 257/81 |
| 7,275,873 B2 | 10/2007 | Auld | |
| 7,292,323 B2 | 11/2007 | Artsyukhovich et al. | |
| 7,699,618 B2 * | 4/2010 | Sone | 439/67 |
| 2005/0157985 A1 | 7/2005 | McGowan, Sr. et al. | |
| 2005/0247759 A1* | 11/2005 | Ice et al. | 228/180.21 |
| 2007/0239148 A1 | 10/2007 | Scheller | |

* cited by examiner

*Primary Examiner* — Ellen Kim
(74) *Attorney, Agent, or Firm* — Kenneth D. Bassinger; Jonathan E. Prejean

(57) ABSTRACT

An accessory is adapted to removably couple to a laser source connector separate from a fiber connector. The accessory includes a first contact element configured to form an electrical connection to a first portion of the laser source connector. The accessory further includes a second contact element configured to form an electrical connection to a second portion of the laser source connector. The second portion of the laser source connector is electrically insulated from the first portion of the laser source connector. The accessory also includes a network connected to the first contact element and the second contact element. The network establishes a defined electrical characteristic between the first and second contact element when a fiber connector is connected to laser source connector.

21 Claims, 5 Drawing Sheets

LASER CONNECTOR ACCESSORY WITH DEFINED ELECTRICAL CHARACTERISTICS

FIELD OF THE INVENTION

This invention relates surgical probes for laser surgery and more particularly to a fiber connector accessory with defined electrical characteristics.

BACKGROUND OF THE INVENTION

Laser surgical probes deliver laser energy from a laser source to a treatment site for tissue. Typically, a laser surgical probe includes a handpiece and an optical fiber that is connected to the laser source by a fiber connector for the probe, so that the optical fiber carries laser energy from the source to the handpiece. For safety reasons, laser sources are configured so that the laser source does not produce laser energy unless a probe is connected to the laser source. Early laser sources used well-known internal circuitry for electrical detection of the probe. Such circuits included, for example, a voltage source coupled to a fixed resistance that would produce a current when a probe connector was connected to the laser source to complete an electrical circuit. When a probe was not connected, the circuit would be open (infinite resistance), and the laser source would be disabled.

U.S. Pat. No. 5,085,492 to Kelsoe et al. (hereinafter "the '492 patent") discloses an alternative to the internal circuitry for detecting connection of the probe. In the configuration described in the '492 patent, the laser source includes a cantilevered, U-shaped ground wire and a contact that serve as a complementary connector for the fiber connector. The fiber connector in turn includes a network of electrical components establishing a fixed electrical characteristic between a contact element mechanically supported by a fiber holding means and another part of the fiber connector that electrically and mechanically engages with the U-shaped ground wire. This provides a defined electrical characteristic for the fiber connector itself, which is in turned used by the laser source to detect the presence of a connected fiber.

One significant drawback of the system described in the '492 patent is that the laser source can only be used with fiber connectors that include a network of electrical components to define an electrical characteristic for the fiber connector. Modifying the fiber connectors of other laser surgical probes to include such a network of electrical components would introduce additional complications in manufacturing the probe as well as additional cost. There is a need, therefore, for a system that would allow these other laser surgical probes to be used with laser sources like the one described in the '492 patent.

BRIEF SUMMARY OF THE INVENTION

In particular embodiments of the present invention, an accessory is adapted to removably couple to a laser source connector separate from a fiber connector. The accessory includes a first contact element configured to form an electrical connection to a first portion of the laser source connector. The accessory further includes a second contact element configured to form an electrical connection to a second portion of the laser source connector. The second portion of the laser source connector is electrically insulated from the first portion of the laser source connector. The accessory also includes a network connected to the first contact element and the second contact element. The network establishes a defined electrical characteristic between the first and second contact element when a fiber connector is connected to laser source connector.

DETAILED DESCRIPTION OF THE INVENTION

Figure 1:
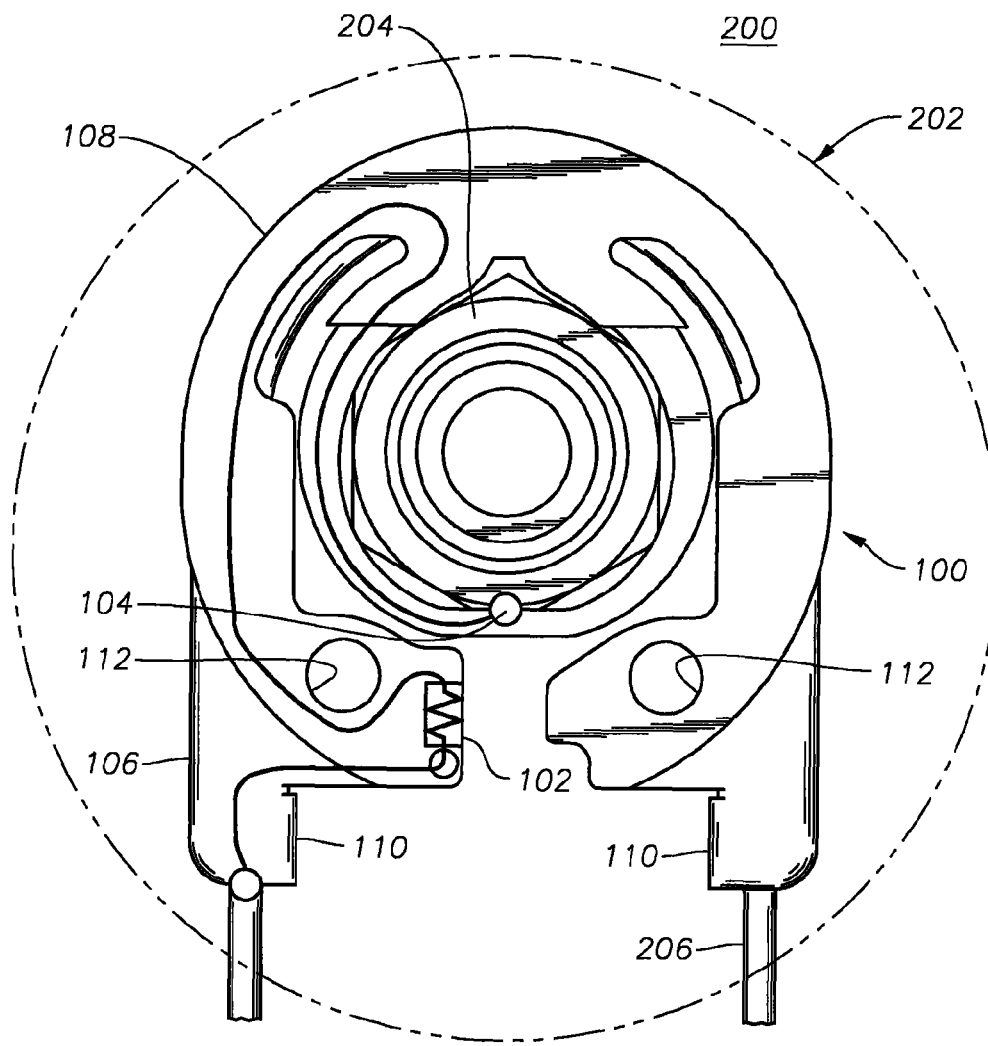
FIG. 1 illustrates a laser connector accessory mounted to a laser source according to a particular embodiment of the present invention.

FIG. 1 illustrates a laser connector accessory 100 according to a particular embodiment of the present invention. In the depicted embodiment, the laser connector accessory 100 is mounted to a console of a laser source 200. The laser source 200 includes a laser source connector 202 having a first portion 204 that receives a fiber connector coupled to a laser surgical handpiece. The laser source connector 202 also includes a second portion 206 that is electrically insulated from the first portion 204, which allows the two portions 204 and 206 to be maintained at different voltages. In the depicted embodiment, the second portion 206 is a U-shaped ground wire, but other forms of conductive material and/or electrical components that are electrically isolated from the first portion 204 may be used as well.

The laser connector accessory 100 includes a network 102 connecting a first contact element 104 and a second contact element 106. The network 102 represents any network of electrical components connected between the first contact element 104 and the second contact element 106 to establish a defined electrical characteristic between the first contact element 104 and the second contact element 106. An insulator 108, which may be any insulating material that can be reliably formed on the laser connector accessory 100 including but not limited to polyimide, is formed around the first and second contact elements 104 and 106 so that the first and second contact elements 104 and 106 are only electrically connected through the network 102 and so that the second contact element 106 is insulated from a fiber connector contacting the laser connector accessory 100. In the depicted embodiment, the insulator 108 is formed as a single piece, but multiple pieces of insulative material could also be used to perform various functions described for the insulator 108. Although the illustrated embodiment shows the network 102 as a resistor, it should be understood by one skilled in the art that other electrical components that useful for establishing an electrical characteristic such as resistance, capacitance, or inductance, including but not limited to resistors, capacitors, inductors, transistors, or diodes, may be employed alone or in combination with one another in the network 102.

The laser connector accessory 100 is mounted to the second portion 206 of the laser source connector 202 so that the second contact element 106 and the second portion 206 are electrically connected to one another. In the depicted embodiment, the second contact element 106 is a conductive metal frame that includes clips 110 for holding the laser connector accessory 100 to the second portion 206 of the laser source connector 202. The conductive metal frame of the second contact element 106 may also include holes 112 that allow the metal frame to be facilitate engagement of an installation tool with the conductive metal frame as described in greater detail with reference to FIG. 4 below.

When the laser connector accessory 100 is placed in contact with the laser source connector 202, as shown in FIG. 1, the first contact element 104 makes electrical contact with the first portion 204 of the laser source connector 202. This in turn forms an electrical connection between the first portion 204 and the second portion 206 across the network 102, thereby establishing a defined electrical characteristic between the first portion 204 and the second portion 206. The electrical characteristic is in turn detected by the laser source 200 to verify the connection of a laser surgical handpiece to the laser source 200.

Figure 2A:
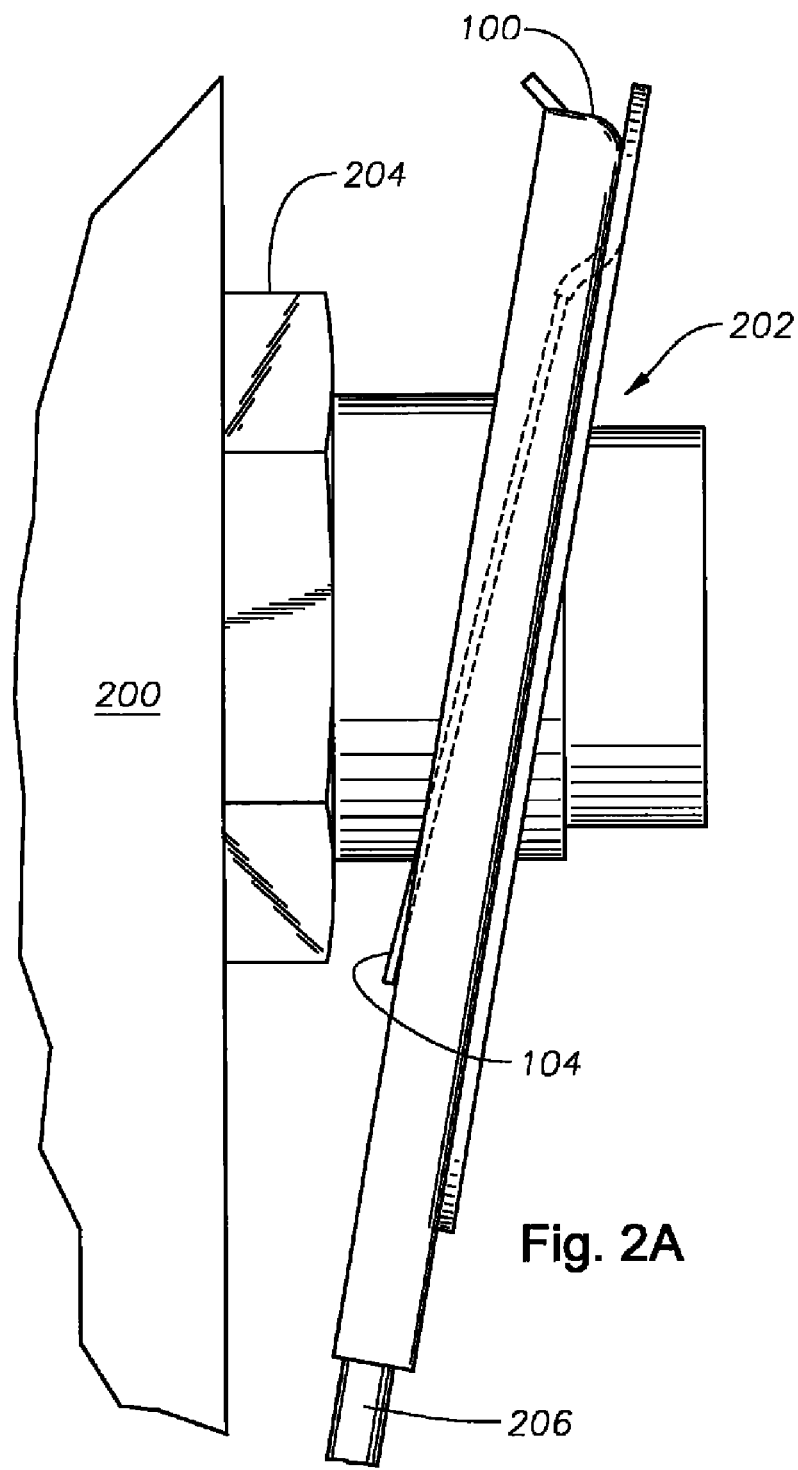
FIGS. 2A and 2B show a side view of the laser connector accessory of FIG. 1 relative to a laser source connector.
Figure 2B:
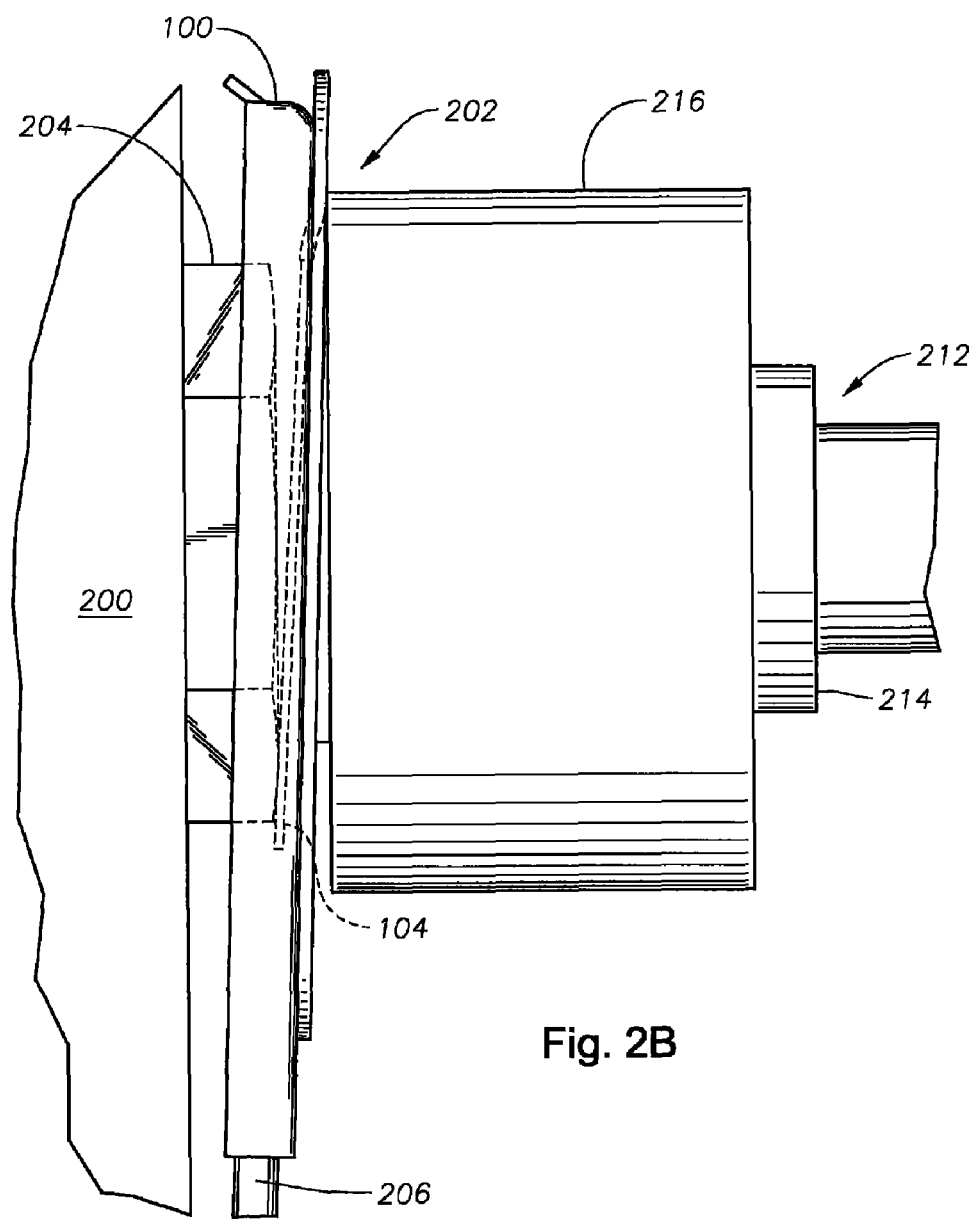

FIGS. 2A and 2B show a side view of the laser connector accessory 100 relative to the laser source connector 202. FIG. 2A depicts the laser connector accessory 100 when no fiber connector is connected to the laser source 200, while FIG. 2B depicts the laser connector accessory 100 when a fiber connector 212 is connected to the laser source 200. As visible in FIG. 2A, the second portion 206 of the laser source connector 202 is cantilevered away from the console of the laser source 200 when the fiber connector 212 (shown with fiber-holding portion 214) is not connected to the laser source connector 202. As shown in FIG. 2B, when a fiber-holding portion 214 of the fiber connector 212 is pushed into the first portion 204 of the laser source connector 202, an outer portion 216 of the fiber connector pushes the laser connector accessory 100 into contact with the laser source connector 202, thus establishing a defined electrical characteristic across the network 102 between the first portion 204 and the second portion 206 of the laser source connector 202.

Because probes may be connected and disconnected from the laser source 200 hundreds or thousands of times, it is preferable that the laser connector accessory 100 be capable of reliably making electrical contact after multiple instances of probe connection and removal. For this reason, it is advantageous to mechanically bias the first contact element 104, which is brought into and out of contact with the first portion 204 of the laser source connector 202, toward the first contact portion 204 so as to facilitate good electrical contact with the first contact portion 204. This can be done, for example, by one or more spring-like joints between the first contact element 104 and the other parts of the laser connector accessory 100. One difficulty that can arise, however, is that repeatedly pushing the first contact element 104 against the first contact portion 204 can permanently deform the spring joints to the point that they are unable to provide a reliable contact force, possibly even to the point that the first contact element 104 breaks off of the laser connector accessory 100. Consequently, it is advantageous to adapt the first contact element 104 by careful selection of materials and shape of the spring joints so that they can be repeatedly deformed without suffering any permanent damage. An example of a suitable material is high-strength Cu—Ni—Sn alloy, which is flexible with good spring properties.

Because the insulator 108 is disposed between the second contact element 106 and the outer portion 216 of the fiber connector, no electrical connection is made between the laser connector accessory 100 and the outer portion 216 of the fiber connector 212 when the fiber connector 212 is connected to the laser source connector 202. If this were not the case, then the network in the fiber connector 212 could be connected in parallel with the network 102 of the laser connector accessory 100, which could at least in principle alter the defined electrical characteristic sufficiently that the laser source 200 would not recognize that the fiber connector 212 had been connected. Because the outer portion 216 is electrically insulated from the laser connector accessory 100 and therefore also insulated from the second portion 206 of the laser source connector 202, no connection across the network in the fiber connector is established. Consequently, the laser connector accessory 100 as described can be used with laser surgical handpieces that include a network within the fiber connector as well as laser surgical handpieces that do not.

Figure 3:
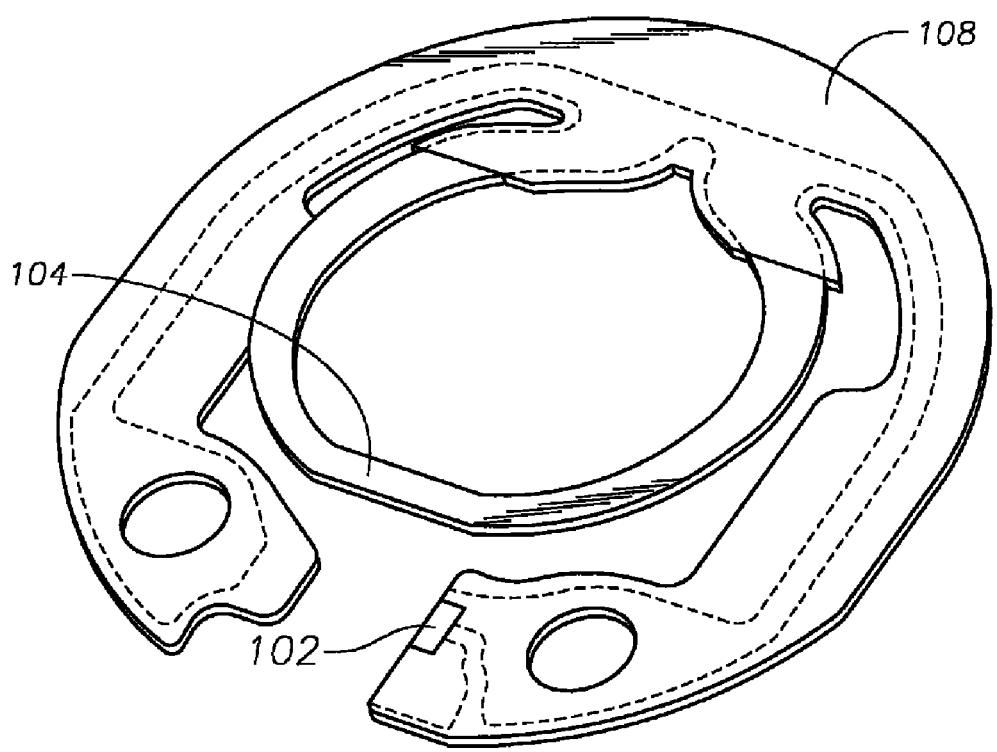
FIG. 3 shows in more detail particular features of the laser connector accessory depicted in FIG. 1.

FIG. 3 shows in more detail particular features of the laser connector accessory 100 depicted in FIG. 1. As shown in FIG. 3, the first contact element 104 and the insulator 108 can be formed as a flexible circuit with the insulator 108, such as a polyimide sheath, surrounding a conductive trace. One end of the conductive trace is connected to the first contact element 104 and the other end is connected to the network 102, shown in FIG. 3 as a chip resistor. Opposite the conductive trace, the network 102 has another end for electrical connection to the second contact element 106. When the flexible circuit is bonded to the second contact element 106, the network 102 is electrically connected to the second contact element 106. For example, if the second contact element 106 includes a metal frame, the end can be electrically connected to the metal frame by conductive epoxy. The insulator 108 prevents shorting between the second contact element 106 and the first contact element 104 and/or the conductive trace.

Figure 4:
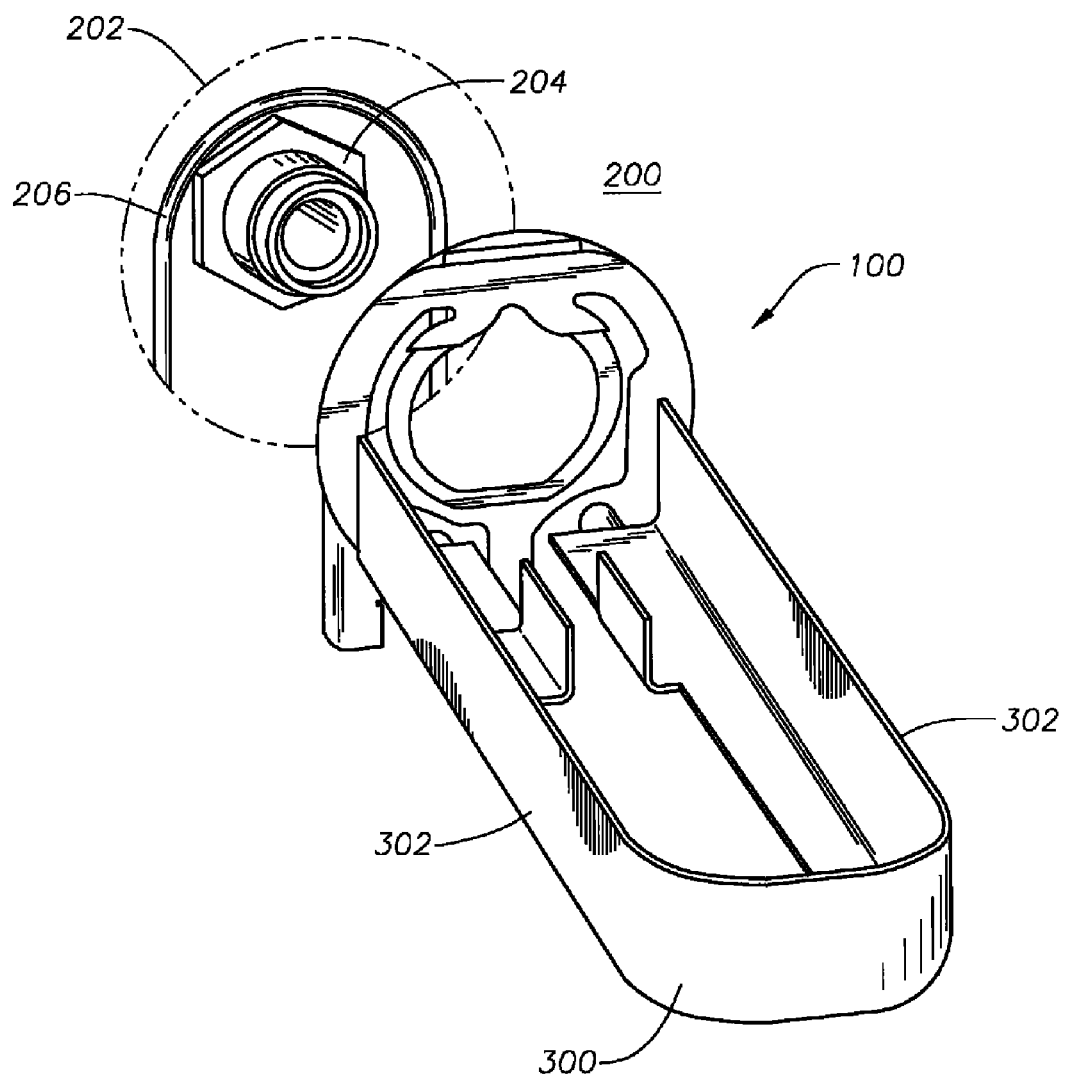
FIG. 4 illustrates an installation tool that can be used to install the laser connector accessory of FIG. 1 according to a particular embodiment of the present invention.

FIG. 4 illustrates an installation tool 300 that can be used to install the laser connector accessory 100. The installation tool 300 includes arms 302 sized to fit within the holes 110 of the metal frame of the second contact element 106. The arms 302 may then be used to deform the metal frame so that the clips 112 on the sides of the metal frame are pulled inwardly. The clip 112 on the top of the frame can be hooked on top of the second portion 206 of the laser source connector 202, and the remaining clips 112 may then be positioned within the second portion 206. When the arms 302 are released, the metal frame returns to its previous shape, and the clips 112 move outwardly to clip onto the second portion 206 of the laser connector 202. The arms 302 are then disengaged from the holes 110, leaving the installed laser connector accessory 100 mounted on the second portion 206.

The laser connector accessory 100 can be removed by engaging the arms 302 into the holes 110 and deforming the metal frame to move the clips 112 inwardly, allowing the laser connector accessory 100 to be removed. The metal frame can be formed from a electrically conductive material that can survive a large number of deformations for installation while still fitting securely onto the second portion 206. An example of a suitable material is high-strength Cu—Ni—Sn alloy, which is flexible with good spring properties. As a safety feature, the installation tool 300 can be attached to an activation key for the laser source 200 such that the laser connector accessory 100 cannot be installed or removed while the activation key is in place. The laser connector accessory 100 can also be attached to the console of the laser source 202 to prevent the laser connector accessory 100 from being lost when it is removed or is inadvertently detached from the console, such as when the laser connector accessory 100 was not securely clipped to the second portion 206.

While certain embodiments of the present invention have been described above, these descriptions are given for purposes of illustration and explanation. However, numerous variations, changes, modifications and departures from the devices and methods disclosed above may be adopted without departure from the scope of the present invention as claimed. In particular, there are numerous mechanical configurations for removably coupling the laser connector accessory to a laser source connector separately from the fiber connector such that the contact elements of the laser connector accessory are held in contact with the corresponding portions of the laser source connector. For example, one skilled in the art of the present invention would readily conceive of other structures for supporting the contact elements, including molded plastic parts, metal pieces, rigid or flexible structures, or any other suitable structure using materials and manufacturing methods known in the art. These, and all other such variations, changes, modifications and departures from the devices and methods known to one skilled in the art of the present invention, should be understood to be encompassed in the claims with a scope that would include them.

What is claimed is:

1. An accessory adapted to removably couple to a laser source connector separate from a fiber connector, the accessory comprising:
   a first contact element configured to form an electrical connection to a first portion of the laser source connector;
   a second contact element configured to form an electrical connection to a second portion of the laser source connector, the second portion of the laser source connector being electrically insulated from the first portion of the laser source connector; and
   a network connected to the first contact element and the second contact element, wherein the network establishes a defined electrical characteristic between the first and second contact element when a fiber connector is connected to laser source connector.

2. The accessory of claim 1, wherein:
   the second portion of the laser source connector comprises a wire; and
   the second contact element comprises at least one clip holding the second contact element to the wire.

3. The accessory of claim 1, wherein the first contact element comprises:
   a conductor; and
   an insulator surrounding at least a portion of the conductor.

4. The accessory of claim 3, wherein the insulator electrically insulates the first contact element from the second contact element.

5. The accessory of claim 3, wherein the insulator is disposed between the second contact element and at least a portion of the fiber connector when the fiber connector is connected to the laser source connector.

6. The accessory of claim 3, wherein the insulator comprises a polyimide sheath.

7. The accessory of claim 1, wherein the second contact element comprises a metal frame configured to be removably mounted on the second portion of the laser source connector.

8. The accessory of claim 1, wherein the first portion of the laser source connector is configured to receive a fiber-holding portion of the fiber connector.

9. The accessory of claim 1, wherein the network is connected to the second contact element by a conductive adhesive.

10. The accessory of claim 1, wherein the network comprises a resistor.

11. The accessory of claim 1, wherein the second portion of the laser source connector comprises a cantilevered wire.

12. The accessory of claim 1, wherein the first contact element is mechanically biased to contact the first portion of the laser source connector.

13. An accessory adapted to removably couple to a laser source connector separate from a fiber connector, the accessory comprising:
   a first contact element configured to form an electrical connection to a first portion of the laser source connector maintained at a first voltage, the first portion of the laser source connector configured to receive a fiber-holding portion of the fiber connector;
   a second contact element configured to form an electrical connection to a second portion of the laser source connector maintained at a second voltage different from the first voltage, the second portion of the laser source connector being electrically insulated from the first portion of the laser source connector, wherein the second contact element comprises a metal frame configured to be removably mounted on the second portion of the laser source connector;
   an insulator around at least a portion of the first contact element electrically insulating the first contact element from the metal frame of the second contact element, the insulator disposed between the first contact element and at least a portion of the fiber connector when the fiber connector is connected to the laser source connector; and
   a network connected to the first contact element and the second contact element, wherein the network establishes a defined electrical characteristic between the first and second contact element when a fiber connector is connected to laser source connector.

14. The accessory of claim 13, wherein the insulator comprises a polyimide sheath.

15. The accessory of claim 13, wherein the second portion of the laser source connector comprises a wire, and the metal frame of the second contact element comprises at least one clip holding the metal frame to the wire.

16. The accessory of claim 13, wherein the second contact portion is connected to the network by a conductive adhesive.

17. The accessory of claim 13, wherein the network comprises a resistor.

18. The accessory of claim 13, further comprising at least two holes in the metal frame, wherein the metal frame can be bent using arms inserted into the metal holes.

19. An installation tool for the accessory of claim 18, the installation tool comprising at least two arms sized to fit within the at least two holes in the metal frame, such that the arms can be manipulated to bend the metal frame.

20. The accessory of claim 13, wherein the second portion of the laser source connector comprises a cantilevered wire.

21. The accessory of claim 13, wherein the first contact element is mechanically biased to contact the first portion of the laser source connector.

* * * * *